(12) United States Patent
Sundholm

(10) Patent No.: US 11,577,912 B2
(45) Date of Patent: Feb. 14, 2023

(54) METHOD AND APPARATUS FOR FEEDING AND CONVEYING MATERIAL

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 17/420,422

(22) PCT Filed: Jan. 13, 2020

(86) PCT No.: PCT/FI2020/050022
§ 371 (c)(1),
(2) Date: Jul. 2, 2021

(87) PCT Pub. No.: WO2020/152396
PCT Pub. Date: Jul. 30, 2020

(65) Prior Publication Data
US 2022/0081206 A1    Mar. 17, 2022

(30) Foreign Application Priority Data
Jan. 25, 2019 (FI) .................................... 20197011

(51) Int. Cl.
*E04F 17/12* (2006.01)
*B65F 5/00* (2006.01)
(Continued)

(52) U.S. Cl.
CPC .............. *B65F 5/005* (2013.01); *B65G 43/08* (2013.01); *B65G 51/22* (2013.01)

(58) Field of Classification Search
CPC .......... B65G 11/04; B65F 1/105; B65F 5/005; E04F 17/10; E04F 17/12; E04F 17/123; E04F 17/126
See application file for complete search history.

(56) References Cited

U.S. PATENT DOCUMENTS

| | | | | | |
|---|---|---|---|---|---|
| 3,490,813 | A | * | 1/1970 | Hallstrom | E04F 17/10 406/120 |
| 3,951,461 | A | * | 4/1976 | De Feudis | B65F 5/005 406/10 |

(Continued)

FOREIGN PATENT DOCUMENTS

| CN | 106429127 A | 2/2017 |
|---|---|---|
| FR | 2807083 A1 | 10/2001 |

(Continued)

OTHER PUBLICATIONS

International Application No. PCT/FI2020/050022, International Search Report dated Mar. 26, 2020, 4 pages.

*Primary Examiner* — Joseph A Dillon, Jr.
(74) *Attorney, Agent, or Firm* — Kilpatrick Townsend & Stockton LLP

(57) ABSTRACT

An apparatus and method for feeding and conveying material in a sorted manner in a pneumatic material conveying system, in which at least two material fractions re fed from a feed aperture and conveyed in a channel space further to a delivery end of a material conveying channel by gravity and/or suction Material is fed from at least one feed aperture of at least one input point and a first material fraction is conducted to the channel space and stored temporarily in the channel space or conducted to the outside of the channel space, and material is fed into a feed-in container, in which a second material fraction fed therein is held in temporary storage by a stopper means.

25 Claims, 7 Drawing Sheets

(51) Int. Cl.
*B65G 43/08* (2006.01)
*B65G 51/22* (2006.01)

(56) References Cited

U.S. PATENT DOCUMENTS

| | | | | |
|---|---|---|---|---|
| 3,986,590 | A * | 10/1976 | Lapidus | B65G 51/04 193/32 |
| 4,013,551 | A | 3/1977 | de Feudis | |
| 4,076,321 | A * | 2/1978 | Haight | B65F 5/005 406/117 |
| 4,902,482 | A * | 2/1990 | Faust | B65F 1/1638 220/495.11 |
| 4,995,765 | A * | 2/1991 | Tokuhiro | B65F 5/005 406/84 |
| 5,213,402 | A * | 5/1993 | Bernal | B65F 1/1426 232/43.1 |
| 5,253,766 | A * | 10/1993 | Sims | E04F 17/12 193/2 A |
| 5,280,688 | A * | 1/1994 | Zoccoli | B65F 1/0093 220/477 |
| 9,434,541 | B2 * | 9/2016 | S.Ratnam | B65F 5/00 |
| 10,399,799 | B2 * | 9/2019 | Sundholm | B65F 1/10 |
| 2010/0243405 | A1 * | 9/2010 | Kang | B65F 1/10 49/344 |
| 2012/0155975 | A1 * | 6/2012 | Sundholm | B65F 1/0093 406/84 |
| 2013/0243536 | A9 * | 9/2013 | Arrabal | B65G 51/00 406/117 |
| 2015/0246773 | A1 * | 9/2015 | Sundholm | B65G 53/56 193/29 |
| 2016/0097206 | A1 * | 4/2016 | Embley | B65G 11/023 29/432 |
| 2016/0145057 | A1 * | 5/2016 | Adamick | B65G 51/02 406/108 |
| 2021/0172629 | A1 * | 6/2021 | Pollock | B65F 5/005 |

FOREIGN PATENT DOCUMENTS

| | | |
|---|---|---|
| WO | 2009080880 A1 | 7/2009 |
| WO | 2009080881 A1 | 7/2009 |
| WO | 2009080882 A1 | 7/2009 |
| WO | 2009080883 A1 | 7/2009 |
| WO | 2009080884 A1 | 7/2009 |
| WO | 2009080885 A1 | 7/2009 |
| WO | 2009080886 A1 | 7/2009 |
| WO | 2009080887 A1 | 7/2009 |
| WO | 2009080888 A1 | 7/2009 |
| WO | 2011110740 A2 | 9/2011 |
| WO | 2014049197 A1 | 4/2014 |
| WO | 2015015054 A1 | 2/2015 |

* cited by examiner

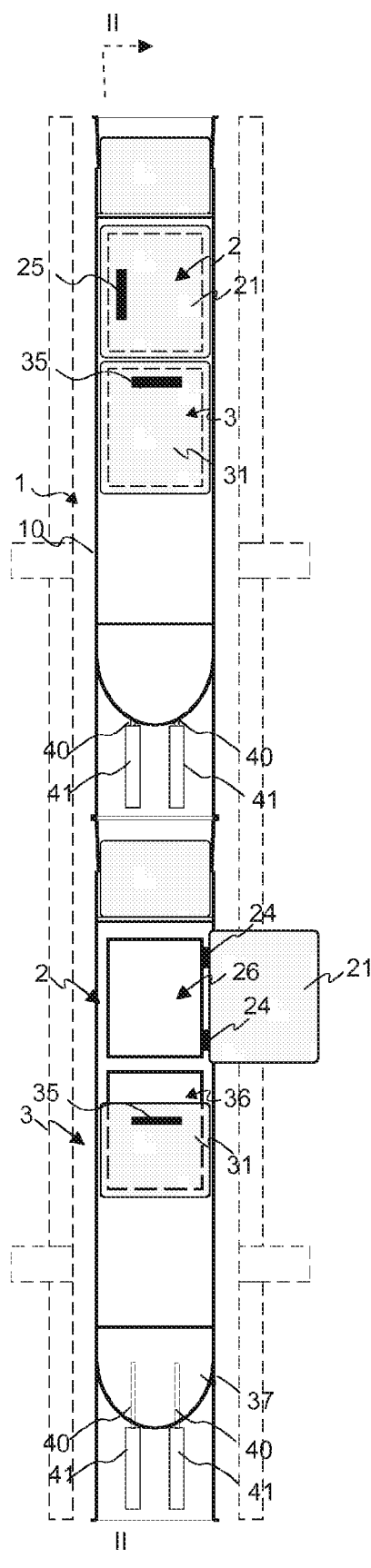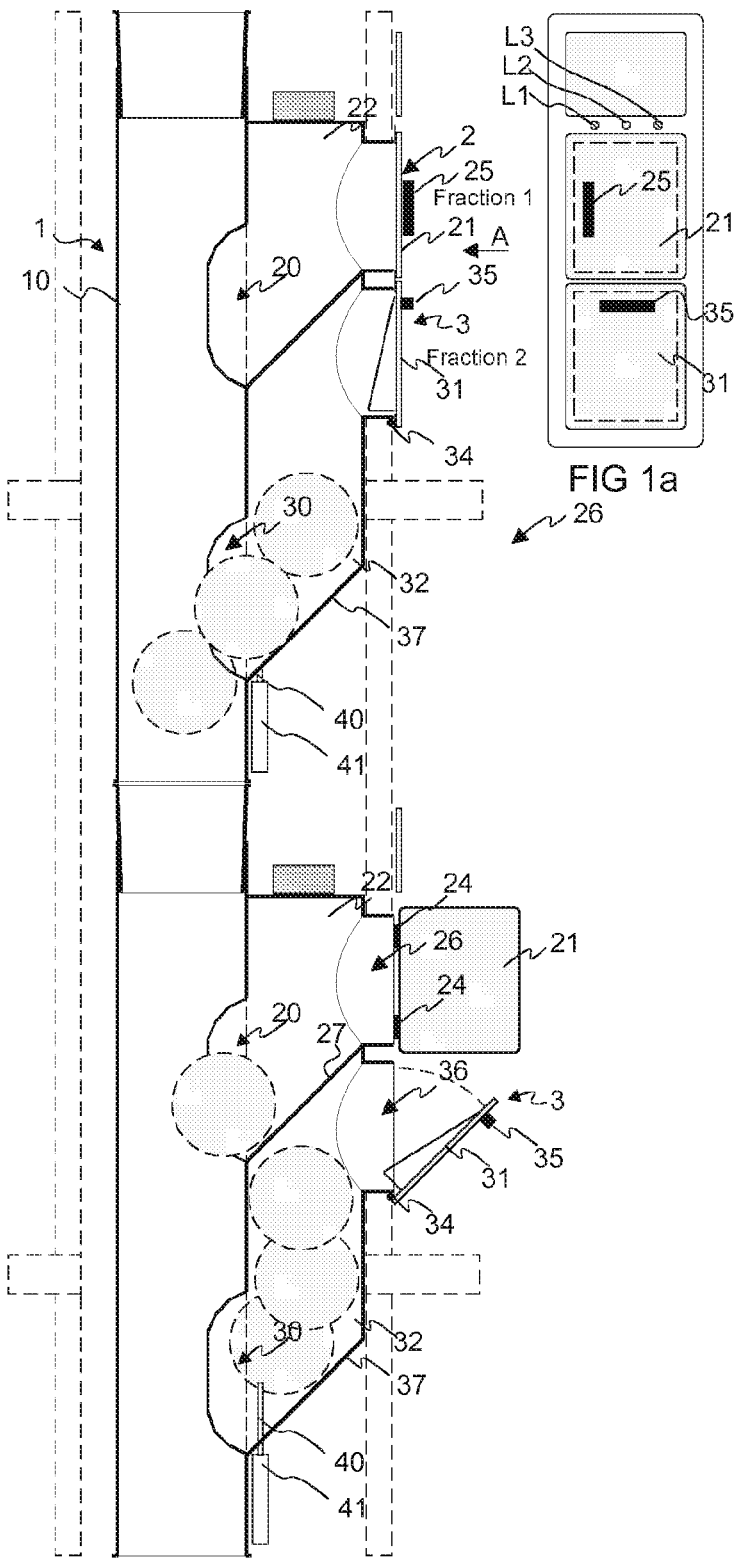
FIG 1
FIG 2
FIG 1a

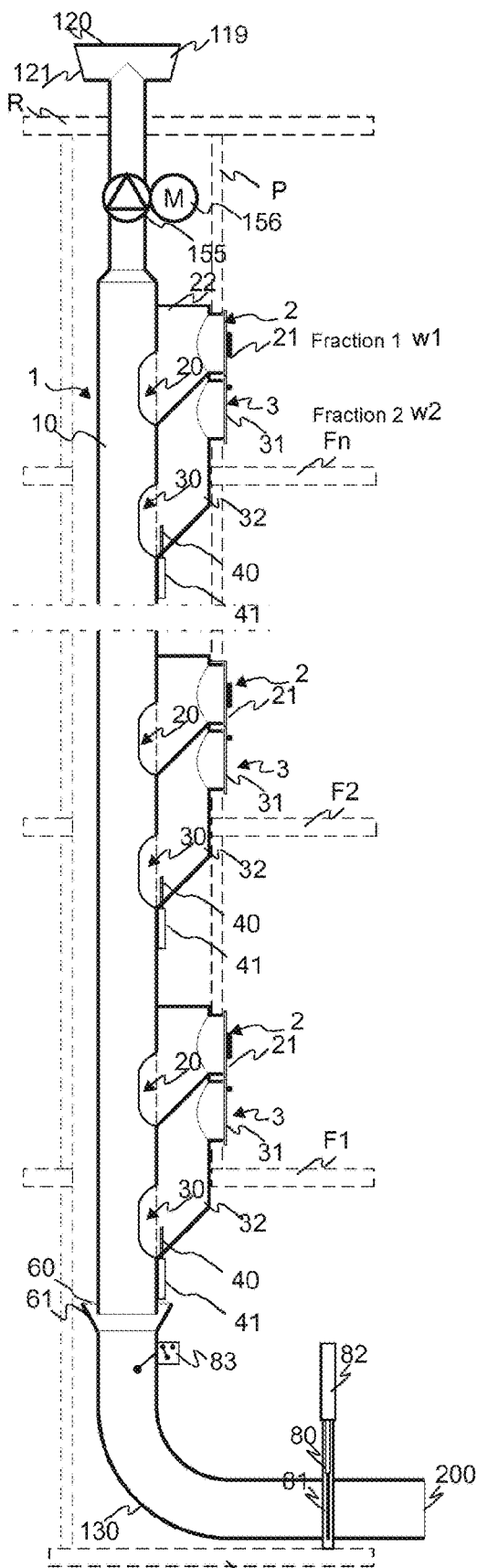
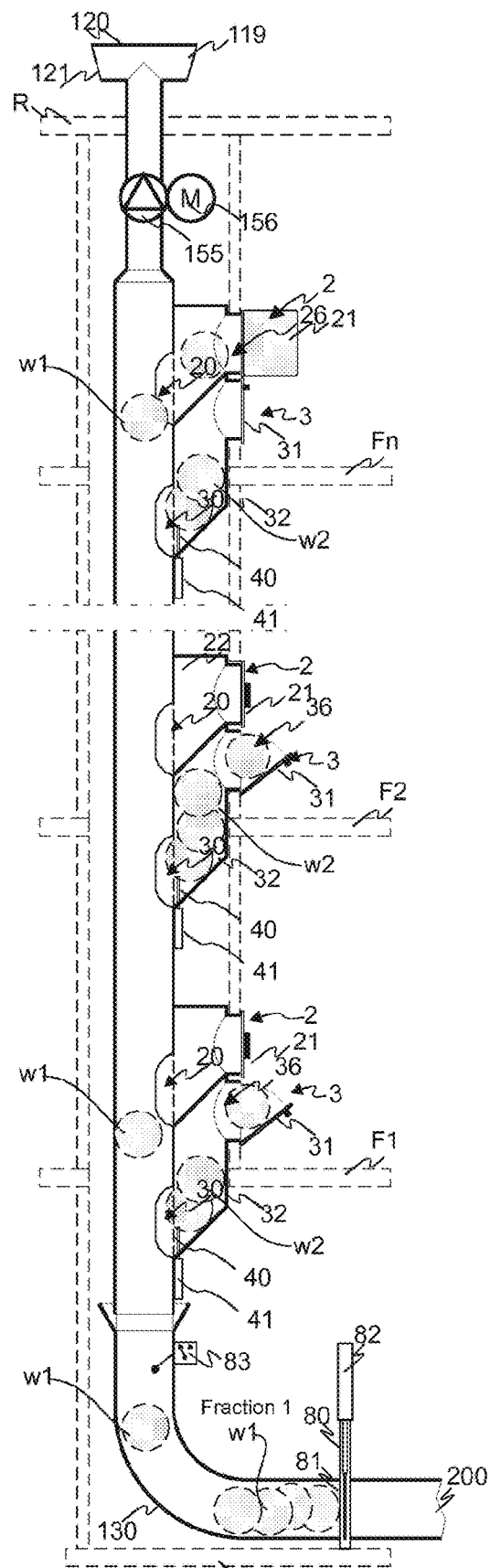

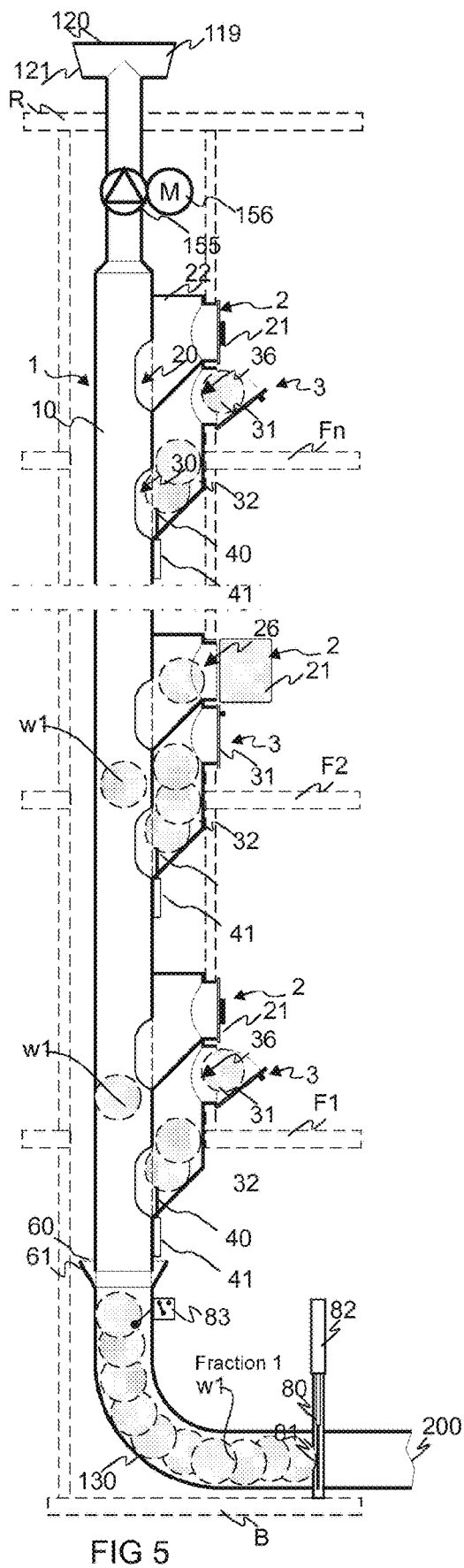
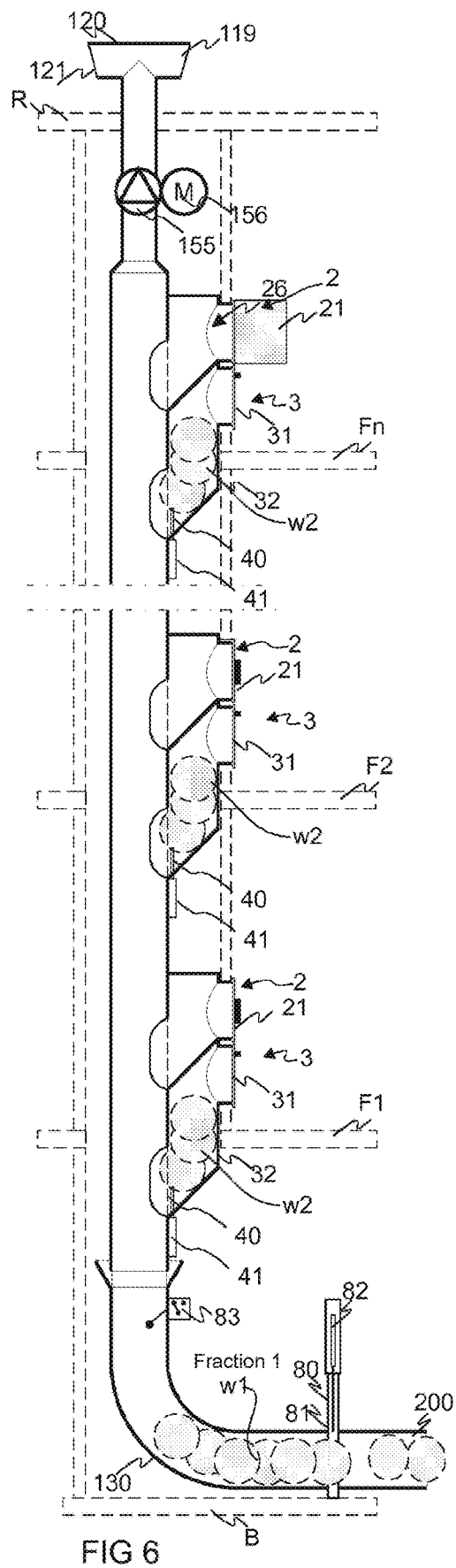
FIG 5
FIG 6

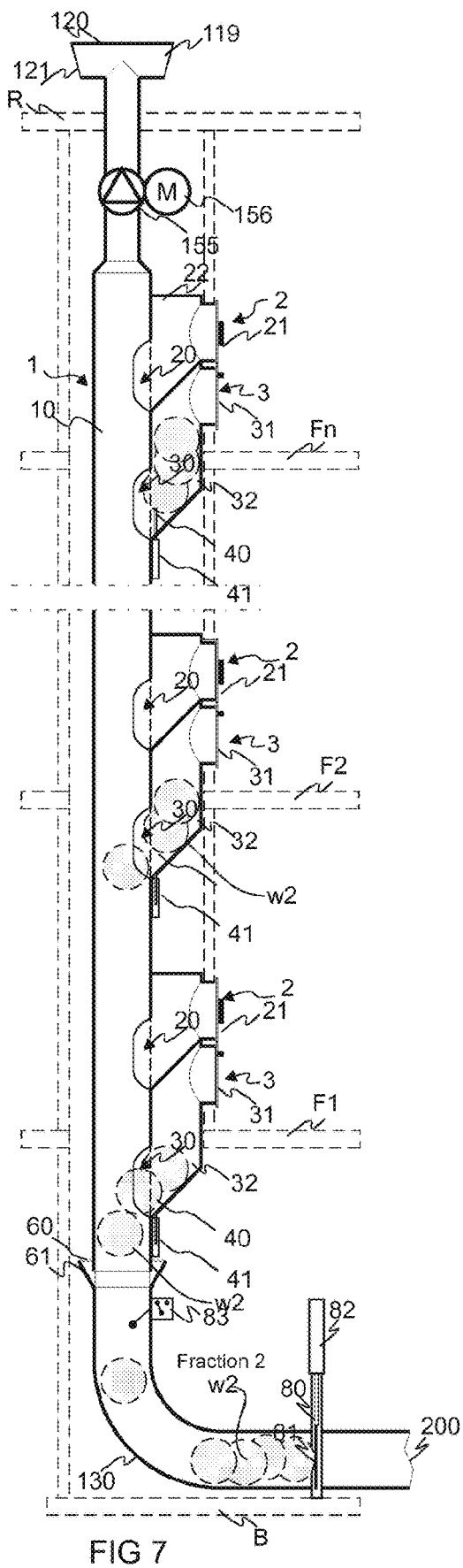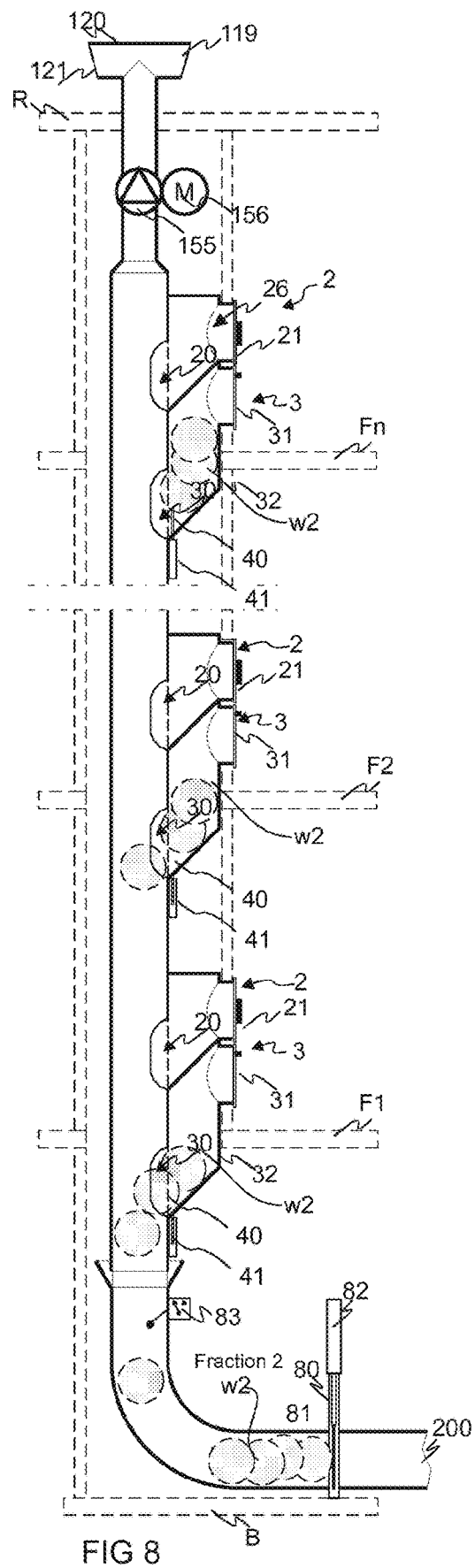

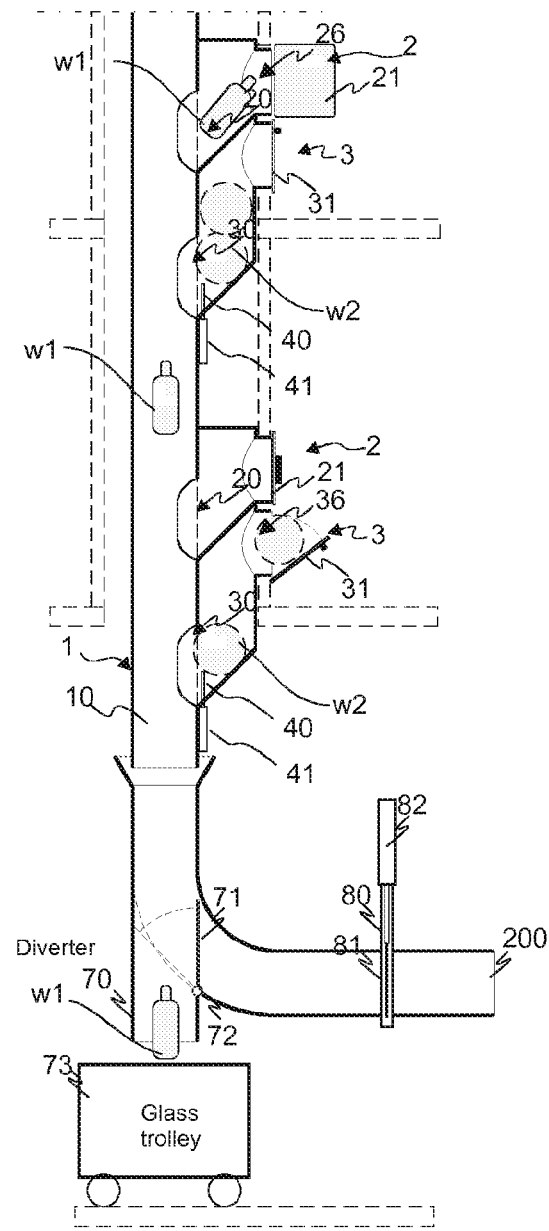
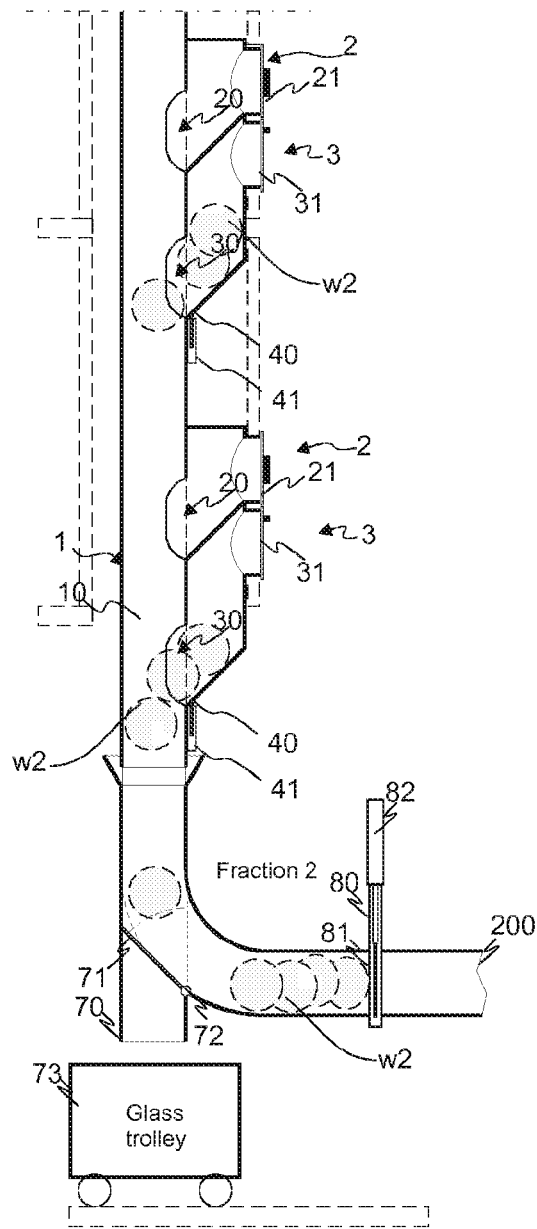
FIG 9
FIG 10

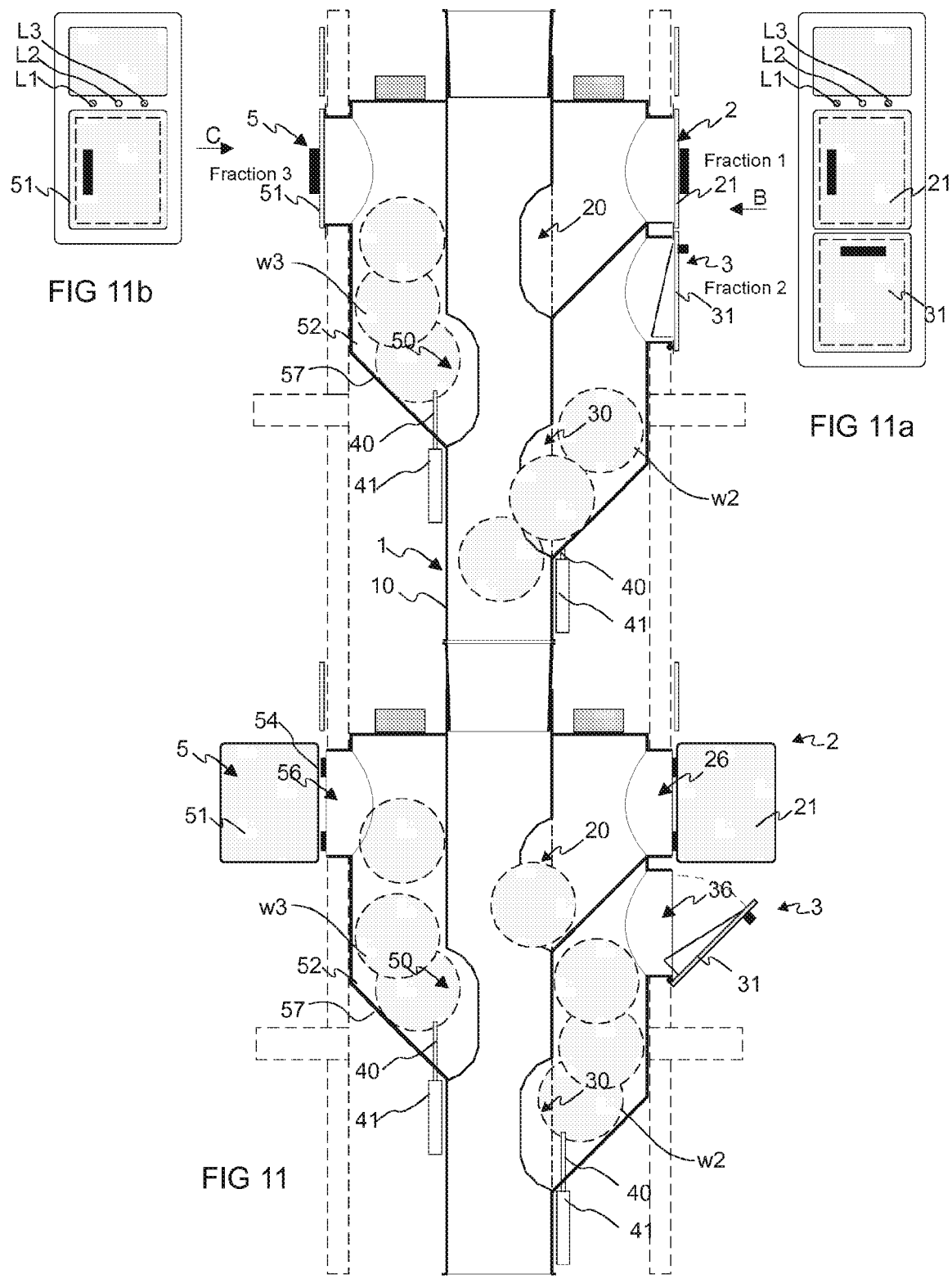

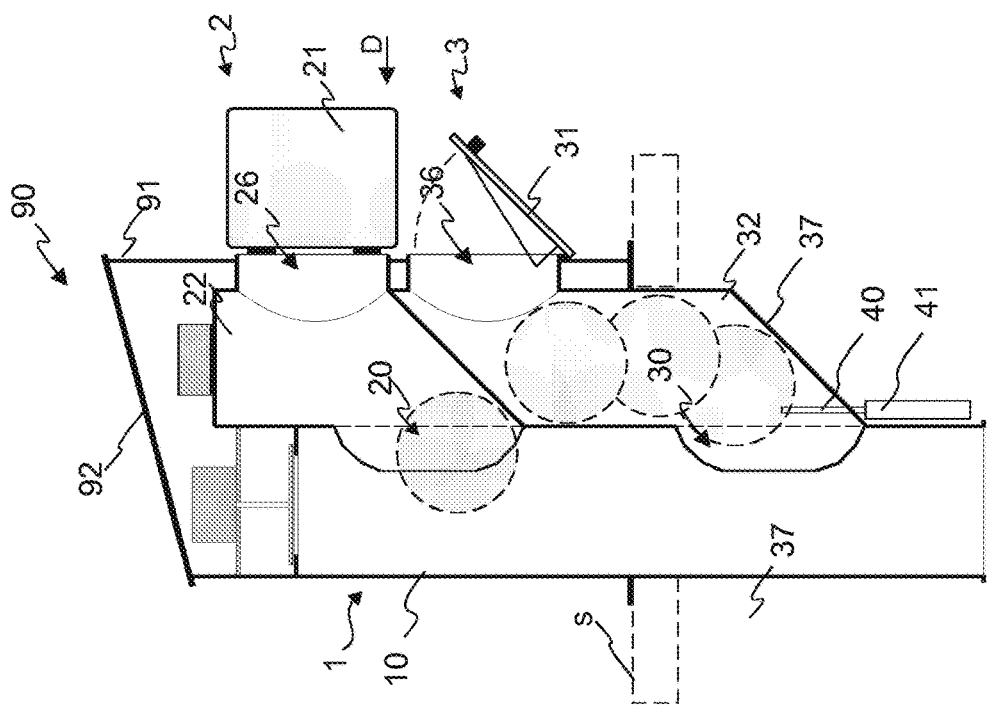
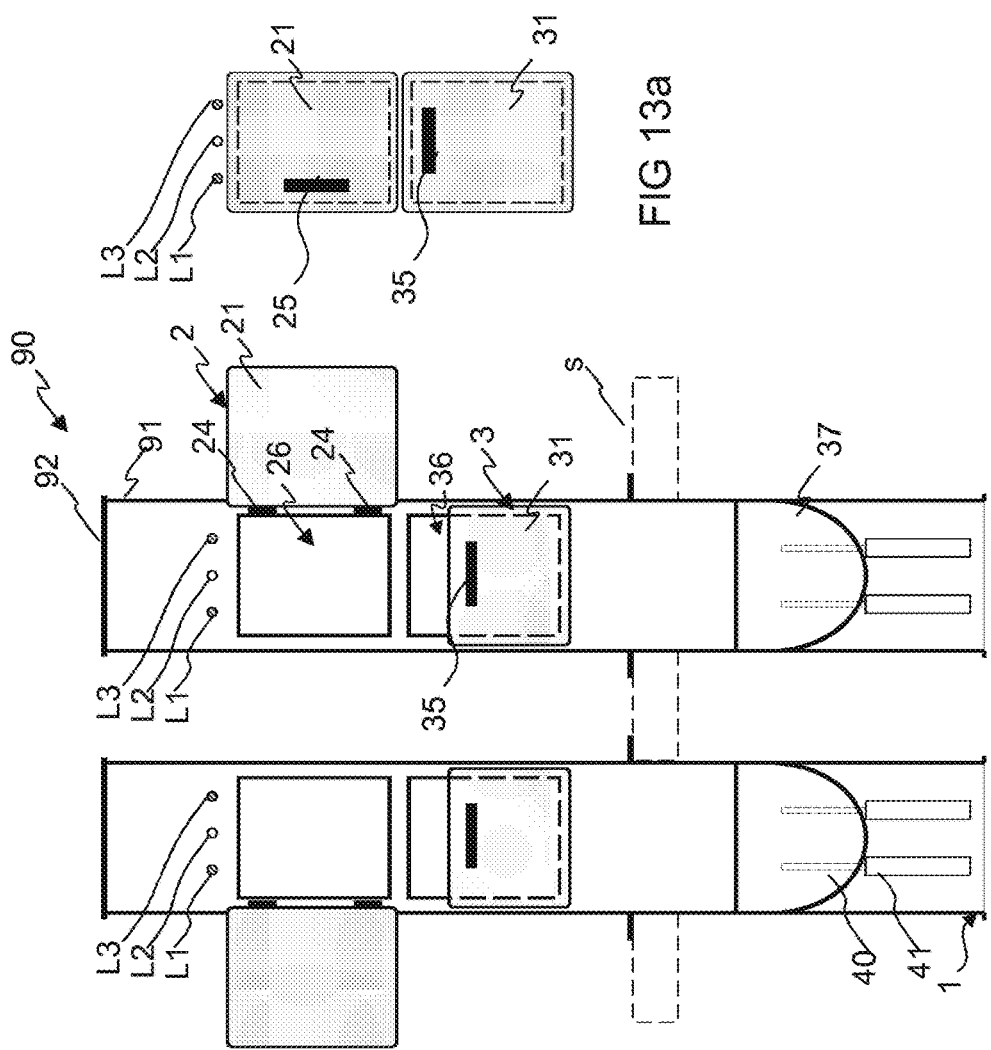

METHOD AND APPARATUS FOR FEEDING AND CONVEYING MATERIAL

CROSS-REFERENCE TO RELATED APPLICATIONS

This application is a U.S. National Phase of International Application No. PCT/FI2020/050022, filed Jan. 13, 2020, which claims the benefit of Finnish Application No. 20197011, filed Jan. 25, 2019, the entire contents and disclosures of which are incorporated herein by reference.

FIELD OF THE INVENTION

The invention relates to a method according to the preamble of claim 1.

The invention also relates to an apparatus according to claim 16.

BACKGROUND OF THE INVENTION

The invention relates generally to material conveying systems, such as to pneumatic partial-vacuum transporting systems, particularly to the collection and conveying of wastes, such as to the conveying of household wastes. Such systems are presented e.g. in publications WO 2009/080880, WO 2009/080881, WO 2009/080882, WO 2009/080883, WO 2009/080884, WO 2009/080885, WO 2009/080886, WO 2009/080887 and WO 2009/080888. The invention also relates to waste feeding means, such as to input points or refuse chutes, with which waste is conveyed, typically by gravity, for example in residential buildings from higher feed apertures to a lower collection space or corresponding container.

Systems wherein wastes are conveyed in piping by means of a pressure difference or suction are known in the art. In these systems, the wastes are conveyed for long distances in the piping by sucking. It is typical to these systems that a partial-vacuum apparatus is used to achieve the pressure difference, in which apparatus a negative pressure is brought about in the conveying pipe with partial-vacuum generators, such as with vacuum pumps or with an ejector apparatus. The conveying pipe typically comprises at least one valve means which is opened and closed in order to regulate the replacement air coming into the conveying pipe. Waste input points, for example rubbish containers or refuse chutes, are used in the systems at the waste material input end, into which waste input points the material, such as waste material, is fed and from which waste input points the material to be conveyed is conveyed into the conveying pipe by opening a discharge valve means, in which case, by means of the sucking effect achieved by the aid of a partial vacuum acting in the conveying pipe and also by means of the surrounding air pressure acting via the refuse chute, material such as for example waste material packed into bags, is conveyed from the refuse chute into the conveying pipe and onwards to a reception point, where the waste material to be transported is separated from the transporting air and conveyed for further processing or for example into a shipping container.

The pneumatic wastes conveying systems in question can be utilized particularly well in densely populated urban areas. These types of areas have tall buildings, in which the input of wastes into the pneumatic conveying system for wastes is performed via an input point, such as a refuse chute, arranged in the building.

The problem in the prior art configurations is that when feeding materials of different material fractions or material kinds in conveying systems in which one material conveying channel is used for transporting the different material kinds in a sorted manner, the user may have to wait at the input point that a specific material fraction may be fed for transportation. This is a particular problem especially in tall buildings or in vessels in which material is to be fed simultaneously into a common channel from different input points thereof.

The object of this invention is to provide a completely novel solution in connection with refuse chutes of a wastes conveying system, by means of which the problems of the prior solutions can be avoided.

BRIEF DESCRIPTION OF THE INVENTION

The invention is based on an idea in which a material conveying channel, for example a refuse chute, comprising at least two input points is provided with at least one stopper means between a feed-in container of at least one of the input points and a feed aperture of the material conveying channel, which stopper means has at least two positions, a first position in which the stopper means extends to a passageway leading to the material conveying channel and limits the passage of material from the feed-in container to the material conveying channel, and a second position in which the stopper means does not essentially limit the conveying of material from the feed-in container to the material conveying channel, and that a connection is provided from a second feed-in container to the material conveying channel, to a container space arranged or formed in a lower part thereof. Material may be fed simultaneously from different feed apertures of an input point, whereby a first material kind is arranged to be directed to the lower part of the material channel, to a storage space, and a second material fraction to a container space of the second feed-in container of the input point and is stored therein when the stopper means is disposed in the first position. The feed-in containers of different input points may be emptied in a controlled manner by acting on the stopper means for example in an order from the bottom to the top in stages or floor by floor, by moving the stopper means from the first position to the second position.

The method according to the invention is mainly characterized by the features of a method for feeding and conveying material in a sorted manner in a pneumatic material conveying system, in which method at least two material fractions (w1, w2) are fed via at least two input points (2, 3) into a channel space (10) of a material conveying channel (1) from a feed aperture and conveyed in the channel space further to a delivery end of the material conveying channel mainly by means of gravity and/or suction generated by a partial-vacuum generator of the pneumatic material conveying system, characterized in that material is fed from at least one feed aperture of at least one input point (2, 3) and a first material fraction (w1) fed via at least one first input point (2, 3) is conducted to the channel space (10) of the material conveying channel (1) and stored temporarily in the channel space (1) or conducted from the channel space to the outside of the channel space, and material is fed into a feed-in container (32) of at least one second input point (3), in which feed-in container a second material fraction (w2) fed therein is held in temporary storage by a stopper means (40), which stopper means (40) prevents the passage of the material fraction (w2) in a first operating state from the second feed-in container (32) to the channel space (1) of the material conveying channel.

The method according to the invention is additionally characterized by the features of:
- in a second stage the first material fraction (w1) fed into the channel space (10) of the material conveying channel (1) and stored temporarily therein is conveyed in a material conveying pipe (200) of the pneumatic material conveying system to a separator device or container in which the material fraction is separated from transport air;
- in a third stage the material fraction (w2) stored temporarily in the feed-in container (32) of at least one second input point (3) is released by moving the stopper means (40) to a second position in which the stopper means (40) does not prevent the passage of material to the channel space (10) of the material conveying channel (1), whereby the material fraction (w2) may pass from the feed-in container (32) to the channel space of the material conveying channel via a feed aperture (30);
- materials or different material fractions are fed simultaneously into feed-in containers of different input points (2, 3);
- feed-in containers (22, 32) of a first input point (2) and a second input point (3) are disposed in proximity to each other, preferably in a vertical direction one on top of the other or in a horizontal direction side by side;
- the first material fraction (w1) is guided from the channel space by opening a passageway (70) to the outside of the channel space by a guide means (71);
- a material feed aperture (26) to the feed-in container (22) of the first input point is openable and closable by a first hatch (21);
- a material feed aperture (36) to the feed-in container (32) of the second input point is openable and closable by a second hatch (31);
- a third material fraction (w3) is fed to at least one third input point (5), into a feed-in container (52) thereof, in which feed-in container the third material fraction (w3) fed therein is held in temporary storage by a stopper means (40), which stopper means (40) prevents the passage of the material fraction (w3) in a first operating state from the second feed-in container (32) to the channel space (1) of the material conveying channel;
- the material fraction (w3) stored temporarily in the feed-in container (52) of at least one third input point (5) is discharged by releasing it, by moving the stopper means (40) to a second position in which the stopper means (40) does not prevent the passage of material to the channel space (10) of the material conveying channel (1), whereby the material fraction (w3) may pass from the feed-in container (32) to the channel space of the material conveying channel via a feed aperture (30);
- the material fraction (w1, w2, w3) conveyed to the channel space (10) of the material conveying channel (1) is conveyed in the material conveying pipe (200) of the pneumatic material conveying system by means of a pressure difference generated by the partial-vacuum generator of the pneumatic material conveying system and/or a transport air flow to the separator device or container in which the material fraction is separated from transport air;
- the material fraction (w) to be conveyed in the method is waste material, such as waste material packed into bags, or recyclable material, or one or more of the following: glass, plastic, paper, paperboard, organic material, biomaterial, mixed waste;
- replacement air is introduced in the method at least in the conveying stage to an opposite side in relation to the conveying direction of a material batch collected in the channel space (10) of the material conveying channel (1).
- the method is used in buildings or vessels to convey waste material or recyclable material; and/or
- part of the channel space of the material conveying channel is arranged to extend in a direction different from the vertical direction.

The apparatus according to the invention is mainly characterized by the features of an apparatus for feeding and conveying material in a sorted manner in a pneumatic material conveying system, which apparatus comprises at least two input points (2, 3) for feeding at least two material fractions (w1, w2) via a feed-in container (22, 32) of the input point (2, 3) into a channel space (10) of a material conveying channel (1) from a feed aperture (20, 30) and conveying them in the channel space further to a delivery end of the material conveying channel mainly by means of gravity and/or suction generated by a partial-vacuum generator of the pneumatic material conveying system, characterized in that the apparatus comprises at least one feed aperture of the input point (2, 3) and a passageway from the feed aperture (26, 36) of the input point of the feed-in container (22, 32) to the channel space (10) of the material channel (1) from the feed aperture (20, 30), and that the passageway from the feed-in container (22) of a first input point (2) to the channel space (10) of the material channel (1) is open, and that in connection with at least a second feed-in container (32) and the channel space (10) of the material channel a stopper means (40) is arranged, which stopper means (40) prevents in a first operating state the passage of a material fraction from the second feed-in container (32) to the channel space (1) of the material conveying channel and in a second operating state releases the material fraction to pass from the second feed-in container (32) to the channel space (10) of the material conveying channel, whereby the second feed-in container is arranged to be used as a temporary storage for material in the first position of the stopper means, and that a channel part of the material conveying channel is provided with means for temporarily storing material fed into the channel or with guide means for conducting material to the outside of the channel space.

The apparatus according to the invention is additionally characterized by the features of:
- feed-in containers (22, 32) of a first input point (2) and a second input point (3) are disposed in proximity to each other, preferably in a vertical direction one on top of the other or in a horizontal direction side by side;
- in the channel space of the material conveying channel a guide means (71) is arranged for guiding a material fraction (w1) from the channel space for opening a passageway (70) to the outside of the channel space by the guide means (71) in a first position thereof and for closing the passageway (70) to the outside of the channel space in a second position of the guide means (71);
- a material feed aperture (26) to the feed-in container (22) of the first input point is openable and closable by a first hatch (21) which is preferably hinged to open and close about a vertical axis;
- a material feed aperture (36) to the feed-in container (32) of the second input point is openable and closable by a second hatch (31) which is preferably of a hopper type and hinged to open and close about a horizontal axis;
- the stopper means (40) is a plate or rod or pipe part moved by a drive device (41);

the material conveying channel (1) is provided with several spaced-apart input stations formed by at least two input points (2, 3);

the stopper means (40) of the feed-in container (32) of at least the second input point are arranged to move from a first position to a second position in stages, starting from the lowest stopper means (40) disposed in the first position and moving from each previous stopper means to the next lowest one, until all stopper means of the material conveying channel (1) have been moved from the first position to the second position;

the apparatus comprises means (60, 61) for conducting replacement air to the channel space (10) of the material channel (1); and/or the apparatus is arranged in a building or a vessel to be applied in conveying waste material or recyclable material.

The solution according to the invention has many significant advantages. By means of the invention, simultaneous use of different input points of the material conveying channel is enabled in the material feeding stage. Further, the partitioned material space of the input points of the material conveying channel may be utilized in the temporary storage of material more efficiently than before. The possibility to feed some of the input points is out of use for only a short time in the material conveying stage. With the solution according to the invention, efficient emptying of the input points and conveying of the material by means of gravity and suction generated by the partial-vacuum generator of the material conveying system are enabled, and at the same time the feed-in containers of at least part of the input points may be utilized for the storage of material. This improves capacity of the system and shortens the time spent by the user for material feeding as compared to the conventional arrangement. Further, the input point arrangement according to the invention may be arranged so as to take a reasonably small space. Hatches of the input points or hoppers arranged one on top of the other are user-friendly and comply with the safety requirements. By arranging a hatch of an upper input point to open to the side, about a vertical hinge, and a lower hatch to open down about a horizontal hinge like a hopper, a configuration which is efficient and safe is provided. The invention may be utilized in systems in which material is conveyed from a mainly vertical material conveying channel to the actual material conveying piping directly, or in systems in which a material shaper is used between the vertical material conveying channel and the actual material conveying piping. By arranging the emptying of the material conveying channel and of the feed-in containers of the input points arranged therein to take place in stages, efficient and well controlled emptying at least partly by means of suction is provided, which contributes to reducing the possibility of blockage.

An embodiment of the invention may also be applied in input points arranged at the upper end of the material conveying channel, where the frame of the input point extends upwards to a distance from the mounting surface, such as floor.

The mainly vertical material conveying channel may also mean a material conveying channel arranged in a direction different from the vertical direction, or it may have parts differing from the vertical direction. The method and apparatus according to the invention are very well suited for use in applications requiring parts differing from the vertical direction, for example horizontal parts.

The method and apparatus according to the invention are particularly well applicable in connection with systems for conveying waste material or recyclable material, such as waste material or recyclable material arranged into bags. The invention may also be applied in conveying other material types or classes of articles in a sorted manner.

BRIEF DESCRIPTION OF THE FIGURES

The invention will now be described in more detail by way of example with reference to the accompanying drawings, in which FIG. 1 illustrates part of one embodiment of an apparatus according to the invention as a simplified view, FIG. 1a is a detail of the embodiment of the apparatus illustrated in FIG. 1 as seen from the direction of arrow A in FIG. 2, FIG. 2 illustrates part of one embodiment of the apparatus according to the invention as a simplified view and a partial cross-section along line II-II in FIG. 1, FIG. 3 illustrates one embodiment of an apparatus according to the invention as a simplified cross-section in a first operating state, FIG. 4 illustrates one embodiment of an apparatus according to the invention as a simplified cross-section in a second operating state, FIG. 5 illustrates one embodiment of an apparatus according to the invention as a simplified cross-section in a third operating state, FIG. 6 illustrates one embodiment of an apparatus according to the invention as a simplified cross-section in a fourth operating state, FIG. 7 illustrates one embodiment of an apparatus according to the invention as a simplified cross-section in a fifth operating state, FIG. 8 illustrates one embodiment of an apparatus according to the invention as a simplified cross-section in a sixth operating state, FIG. 9 illustrates a detail of an embodiment of one apparatus according to the invention as a simplified cross-section in a first operating state, FIG. 10 illustrates a detail of an embodiment of one apparatus according to the invention as a simplified cross-section in a second operating state, FIG. 11 illustrates a detail of an embodiment of one apparatus according to the invention as a simplified cross-section, FIG. 11a illustrates a detail of an operating panel of input points of the apparatus according to FIG. 11 as seen from the direction of arrow B in FIG. 11, FIG. 11b illustrates a detail of an operating panel of an input point of the apparatus according to FIG. 11 as seen from the direction of arrow B in FIG. 11, FIG. 12 illustrates one further embodiment of an apparatus according to the invention as a simplified partial cross-section, FIG. 13 illustrates one embodiment of an apparatus according to the invention as a simplified view, FIG. 13a illustrates a detail of an operating panel of an input point of the apparatus according to FIG. 13.

DETAILED DESCRIPTION OF THE INVENTION

FIG. 1 is a simplified diagram illustrating part of one apparatus applying the invention. The apparatus has a mainly vertical material conveying channel 1, such as a feeding chute, which may comprise at least one input station. The input station may have several input points 2, 3, and from each of them there may be a feed aperture 20, 30 for feeding material w1, w2, w3 from the feed aperture 20, 30 into a channel space 10 of the mainly vertical material conveying channel 1. An openable and closable hatch 21, 31 or the like may be provided in connection with each of the input points 2,3, as illustrated in the embodiment of FIGS. 1 and 2, which hatch in the closed state blocks the connection from the outside of the input point via the feed aperture 20, 30 to the material conveying channel 1, to the channel space. In connection with the input point there may be arranged a feed-in container 22, 32 via which the material is fed into the feed aperture 20, 30 of the material conveying channel. In the opened state the hatch 21, 31 of the input point enables the feeding of material from the outside of the input point via the feed aperture 20, 30 into the channel space 10 of the material conveying channel 1 or at least into the feed-in container 22, 32 arranged in the input point. The input point may be provided with one stopper means 40 having at least two positions, a first position in which the stopper means 40 limits the passage of the material w via the feed aperture to the channel space 10 of the material conveying channel, and a second position in which the stopper means 40 does not essentially limit the passage of the material w via the feed aperture to the channel space 10 of the material conveying channel 1. According to one embodiment the stopper means is arranged between the feed aperture of the feed-in container and the material conveying channel 10. The stopper means 40 may be arranged at the wall of the feed-in container so that the stopper means 40 extends in the first position over at least part of the passageway of material from the feed-in container to the material conveying channel. In the embodiment of FIGS. 1 and 2 the stopper means 40 may be arranged to extend upwards to a distance from a base part 37 of the feed-in container, preventing the passage of material from the feed-in container 32 through the feed aperture 30 into the material space 10 of the material channel. In the second position the stopper means 40 does not essentially extend upwards from the base part 37 of the feed-in container, whereby the material is able to pass from the feed-in container to the channel space 10 of the material conveying channel. A drive device 41 is arranged to move the stopper means 40. According to one embodiment the drive device 41 is an actuator, for example an actuator providing a linear movement. One such actuator is for example a cylinder-piston unit, the stopper means being arrangeable in the piston thereof. The stopper means 40 may be for example a rod means, a fork or the like. In the embodiment illustrated in the figures, at least two stopper means 40 are arranged in proximity to the applicable material channel feed apertures. The number may be smaller or larger depending for example on the material to be processed, the shape of the stopper means or other requirements of the application.

In the embodiment illustrated in FIGS. 1 and 2, the stopper means is arranged between a second input point 3 and the material conveying channel. Between a first input point 2 and the material conveying channel there is no stopper means in the embodiment of the figure. In the upper configuration of FIGS. 1 and 2 the stopper means are illustrated in the second position in which the stopper means does not limit the passage of material from the feed-in container 32 of the second input point 3 to the channel space 10 of the material conveying channel via the feed aperture 30. In the lower configuration of FIGS. 1 and 2 the stopper means 40 are illustrated in the first position in which they prevent material from passing from the feed-in container of the second input point to the material space 10 of the material conveying channel.

A feed-in container 32 may thus be arranged in connection with an input point for storing material fed into the feed-in container via a feed aperture 36 of the feed-in container 32 before feeding material via the feed aperture 30 of the material conveying channel 1 into the channel space 10. In the embodiment of FIG. 1, several input points 2, 3 may be arranged in proximity to each other. In FIG. 1, two input points 2, 3 are arranged in proximity to each other. The input points 2,3 may be arranged in a vertical direction at a distance from each other. A first input point 2 is arranged higher and a second input point 3 is arranged below the first input point, at a distance from the first input point. A feed aperture 20 of the first input point 2 or a feed aperture 26 of the feed-in container 22 thereof is provided with a first hatch 21. A feed aperture of the feed-in container 32 of the second input point 3 is provided with a second hatch 31. The input points may also be in the opposite order, whereby the feed aperture of the first input point, or the feed aperture of the feed-in container thereof, is disposed below the feed aperture of the second input point or the feed aperture of the feed-in container thereof in the vertical direction. It may be considered that in some cases there are even more input points in the same input station, whereby one or more input points may be disposed in a horizontal direction at a distance from each other, or the feed apertures thereof or the feed apertures of the feed-in containers thereof are disposed at a distance from each other. For example, FIG. 5 illustrates one embodiment in which there is a third input point 5 disposed in the horizontal direction at a distance from the first and the second input points. This embodiment will be described in more detail hereinafter.

FIGS. 1, 2 and 1a thus illustrate an embodiment in which the feed aperture 20 of the first input point 2 or the feed aperture 26 of the feed-in container 22 of the first input point, and the feed aperture 30 of the second input point 3 or the feed aperture 36 of the feed-in container 32 of the second input point may be arranged for example in the vertical direction at a distance from each other. In connection with the first feed aperture or the second feed aperture 30 there may be arranged a feed channel connecting the feed aperture 26 of the feed-in container of the first input point 2 or the feed aperture 36 of the feed-in container of the second input point 3 by way of the feed channel via the feed aperture 20, 30 of the material conveying channel 1 to the channel space 10. According to one embodiment, stopper means 40 may be arranged in connection with the feed aperture 20, 30 of the material conveying channel 1 to limit the quantity or size of the material w to be fed and to prevent the feeding of material into the material conveying channel. Several input points 2, 3 and feed apertures 20, 30 and/or hatches 21, 31 of the input point may be arranged for the material conveying channel at a distance from each other, as in the embodiment of FIG. 1, 2. The input points may be arranged in the vertical direction at a distance from each other, for example on different floors F1, F2, F3 . . . Fn of a building or a vessel (for example as illustrated in FIG. 3-8). In the embodiment illustrated in FIG. 3-8, the input points 2, 3 are arranged in connection with a vertical wall P. The input points 2, 3 will be described in more detail hereinafter.

As illustrated in FIG. 3-8, the mainly vertical material conveying channel 1, such as a feeding chute, may be connected at the lower part of the material conveying channel 1 to a conveying pipe 200 of a pneumatic material conveying system. In FIG. 1, a curved channel part 130 is arranged between the material conveying channel 1 and the conveying pipe of the pneumatic material conveying system. Between the curved channel part 130 and the material conveying pipe 200, a discharge valve 80 may be arranged. The discharge valve 80 may comprise a shut-off means 81 and a drive device 82 thereof. The coupling between the material conveying channel 1 and the material conveying pipe 200 is in the embodiment of FIG. 3-8 arranged for example in a space located in the lower part of the building, such as in a basement B.

In the conveying piping 200 of the pneumatic material conveying system the material may pass together with transport air to a reception point of the system, such as a waste station, in which the material to be transported, such as waste material or recyclable material, is separated from transport air and conveyed for further processing or to a shipping container. The operation of the pneumatic material conveying system, specifically a waste conveying system, will not be explained in further detail herein. Different examples of pneumatic waste transport systems are presented generally for example in publications WO 2009/080880, WO 2009/080881, WO 2009/080882, WO 2009/080883, WO 2009/080884, WO 2009/080885, WO 2009/080886, WO 2009/080887, WO 2009/080888, and WO/2011/110740.

At least one stopper means 40 may be arranged between the feed aperture 26, 36 of the feed-in container of the first input point 2 and/or the second input point 3 and the material conveying channel 10, the stopper means having at least two positions, a first position in which the stopper means 40 limits the passage of the material w via the feed aperture 20, 30 to the channel space 10 of the material conveying channel, and a second position in which the stopper means 40 does not essentially limit the passage of the material w via the feed aperture 20, 30 to the channel space 10 of the material conveying channel 1.

In FIG. 1, a base 27 of the feed-in container 22 of the first input point 2 may be formed to be inclined, whereby the base slopes from the direction of the feed aperture 26 of the feed-in container 22 towards the feed aperture 20 of the material conveying channel 1. The base 37 of the feed-in container 32 of the second input point 3 may be formed to be inclined, whereby the base slopes from the direction of the feed aperture 36 of the feed-in container 32 towards the feed aperture 30 of the material conveying channel 1. The feed aperture 26, 36 of each of the feed-in containers may be arranged in the vertical direction at a distance from the corresponding feed aperture 20, 30 leading to the material space of the material channel. Material may thereby be fed from the feed aperture 26, 36 of the feed-in container, and the material passes in the vertical direction to the lower feed aperture 20, 30 of the material space, preferably guided by the base 27, 37 inclined towards the feed aperture of the feed-in container.

In the figure, the hatch 21 which at least partly blocks in a first position (closed position) the aperture of the first input point 2 is arranged in a pivotable manner. In the embodiment of the figure, it is arranged to pivot about a vertical axis for example by means of hinges 24. The hatch may comprise opening means. To illustrate the opening means, a handle 25, 35 is depicted in the figures. Correspondingly, the apparatus comprises closing means (not illustrated) for the hatch. The hatch 21, 31 may be released to open only when that is appropriate for the operation of the apparatus. In connection with the input points, different information means indicating the operating state of the apparatus may further be provided. The information means enable communication with the user and instructions for the operation of the user. In the figures, light indicators L1, L2, L3 are illustrated as the information means. The information means or a display thereof may be arranged at the input point, for example in a panel above the first hatch, as illustrated in FIG. 1a. FIGS. 1 and 2 illustrate the input points 2, 3 in the upper configuration of the figures with the hatch disposed in the first position, the closed position, and in the lower configuration of the figure with the hatch disposed in the second position, the opened position, in which the material may be fed to the input point, into the feed-in container thereof.

FIG. 3-8 illustrate a first input point 2 and a second input point 3 on a first floor F1, and correspondingly a first input point 2 and a second input point 3 on a second floor F2. The figure also illustrates a first input point 2 and a second input point 3 on a highest floor Fn. An upper end of the material conveying channel 1 may extend for example higher than the input points of the highest floor Fn, for example through a roof R. The channel space 10 of the material conveying channel 1 is connected at an upper end 119 thereof to an air duct 121. To protect the upper end 119 of the material conveying channel, a protective part 120 may be provided. According to the figure, the air duct is located on the roof of the building. Between the air duct 121 and the channel space 10 of the material conveying channel, a fan 155 and a drive device 156 thereof may be arranged for keeping the material conveying channel under a negative pressure and for ventilating it.

In the embodiments illustrated in FIGS. 1 and 2, the material conveying channel 1 extends through the structures separating different floors F1, F2, F3 . . . Fn of the building.

In the embodiment according to FIG. 4, material may be fed, when at least the hatch 21 of at least one first input point 2 is in a state in which it may be opened, from the feed aperture 20 of the material conveying channel 1 of the first input point into the channel space 10. In the embodiment of the figure, a first material fraction w1 is to be fed from the feed aperture of the first input point. The material fed passes in the channel space 10 to the lower part thereof, for example into the curved channel part 130. The material fed via the first input point may thus be stored temporarily in the lower part of the material conveying channel.

According to one embodiment, in the lower part of the material conveying channel 1 there may be arranged a guide means 71 with which the material may be guided forward in the material conveying channel 1 or out from the channel space 10 of the material conveying channel 1, via an aperture or a connector 70 arranged at the wall of the channel. According to one embodiment, material fed from the first input point may be guided out from the lower part of the material conveying channel for example to a container 73 or the like via the aperture or connector 70, when the guide means 71 blocking the aperture or connector 70 in a first position is disposed in a second position in which the passageway from the material space 10 of the material conveying pipe to the outside thereof via the aperture or connector 70 is open. This configuration is illustrated for example in FIG. 9.

The guide means 71 may be for example a flap means configured to pivot about a joint 72 to a first position in which the passageway via the aperture or connector 70 from the channel space 10 of the material channel is closed, and a second position in which the passageway from the channel space of the material conveying channel via the aperture or connector 70 is open. The guide means may also be some other type of a passageway diverting means. In the embodiments of FIGS. 9 and 10, a first material fraction w1 is arranged to be guided to the outside of the material conveying channel. The first material fraction may be in this case for example glass materials, such as glass bottles, glass jars or other glassware. Depending on the application, some other material fractions may also be conducted from the material conveying channel.

When the hatch 31 of the second input point 3 is in a state in which the hatch may be opened, material w2 may be fed into the storage space 32 provided in connection with at least one second input point. According to one embodiment, material may be fed into the feed-in container 32 of each of the second input points 3, even if the material conveying channel is simultaneously fed from the first input point 2 of some other input station, for example of a different floor.

As illustrated in FIG. 4, material w2 may be fed simultaneously into the feed-in containers 32 of the second input points 3 on different floors F1, F2 . . . Fn and stored therein when the stopper means 40 arranged in connection with the feed aperture 30 between the feed-in container of the input point and the material conveying channel 1 is in the first position in which it prevents the passage of material from the feed-in container 32 to the channel space 10 of the material conveying channel 1. In FIG. 4, a first material w1 is fed into the feed-in container of the first input point 2 of the floor Fn from the feed aperture 26, which first material passes along the sloping base of the feed-in container to the channel space 10 of the material conveying channel 1 from the feed aperture 20 and further in the material conveying channel 1 to the lower part thereof, into a temporary storage which in the figure is in the curved channel part 130. In the figure, the material is prevented from passing in the channel further by the shut-off means 81 of the discharge valve 80 of the material channel, which shut-off means separates the material conveying channel 1 from the conveying pipe 200 of the pneumatic conveying system.

At the same time, a second material fraction w2 may be fed into the feed-in container 32 of the second input point 3, wherein the stopper means 40 in the first position stops and prevents the material w2 from passing to the channel space of the material conveying channel via the feed aperture 30. In FIG. 4, the second material w2 is fed for example from the second input point 3 of the first floor F1 via the feed aperture 36 thereof into the feed-in container 32n and from the second input point 3 of the second floor F2.

The feeding of material may be continued, for example as illustrated in FIG. 5 from the second input point of the floor Fn into the feed-in container thereof and into the second feed-in container of the floor F1. The first material is fed from the first input point 2 of the second floor, whereby it passes to the material channel and to the temporary storage space in the lower part thereof. A material quantity monitoring means 83 may be arranged in the apparatus to provide an impulse or information on the basis of which the first material w1 collected in the lower part of the channel space 1 may be discharged. The material quantity monitoring means 81 may be for example a limit switch or a means monitoring the level of the material quantity. The material collected in the material conveying channel may be discharged on the basis of the impulse of the material quantity monitoring means. This may be done for example by opening the shut-off means 81 of the valve 80 to a position in which it does not limit the conveying of material from the channel part 130 of the material conveying channel 1 to the material conveying piping 200. Thereby also the suction of the partial-vacuum generator of the pneumatic material conveying system is able to act from the direction of the material conveying piping 200 on the material w1, whereby the material passes due to the pressure difference and the transport air flow to the conveying piping in which it is transported to the container or separator arranged at the delivery end of the conveying piping, in which container or separator the material w1 is separated from the transport air flow. Replacement air to the material conveying channel flow may be conducted for example from a replacement air channel 60 which may be provided with a valve means, such as a flap arrangement. The replacement air channel 60 may be arranged at a connection point 61 between the material conveying channel 1 and the channel part. During the discharge cycle it may be typical that the hatches of the input points are closed. When discharging is completed, the discharge valve returns to the position in which the shut-off means 81 prevents material from passing from the channel space 10 of the material conveying channel to the conveying piping 200.

FIG. 7 illustrates an operating state in which the second material fraction w2 stored in connection with the second input points 3, in the feed-in containers 32, is discharged. Thereby the material resting on the stopper means of the feed-in containers is released to pass to the channel space 10 of the material conveying channel 1 via the feed apertures 30 when the stopper means 40 is moved to the second position in which it does not prevent material from passing to the channel space 10. According to one embodiment the feed-in containers of the second input points 3 are emptied in an order from the input point closest to the material conveying pipe 200, in FIG. 7 in an order from the bottom to the top. According to one embodiment, when emptying the feed-in containers the material resting on the stopper means of different input points may be released at least partly simultaneously. When material has collected in the lower part of the material conveying channel 1, the passageway to the conveying piping 200 may be opened by opening the shut-off means 81 of the valve 80 with the drive device 82. Thereby also the suction of the partial-vacuum generator of the pneumatic material conveying system is able to act from the direction of the material conveying piping 200 on the material w2, whereby the material passes due to the pressure difference and the transport air flow to the conveying piping 200 in which it is transported in the transport air flow to the container or separator arranged at the delivery end of the conveying piping, in which container or separator the material w2 is separated from the transport air flow. When discharging is completed, the discharge valve returns to the position in which the shut-off means 81 prevents material from passing from the channel space 10 of the material conveying channel to the conveying piping 200.

After this the stopper means 40 may again be moved to the position in which they prevent material fed to the second input points, into the feed-in containers thereof, from passing to the channel space 1 of the material conveying channel. It is thus possible to again start the feeding of the first material and collecting it into the channel part 130 in the lower part of the material conveying channel.

FIGS. 9 and 10 illustrate an alternative in which the first material fraction w1 is conveyed out from the channel space from the lower part of the material channel. According to one embodiment a guide means 71 may have been arranged in the lower part of the material conveying channel 1, by which guide means the material may be guided forward in the material conveying channel 1 or out from the channel space 10 of the material conveying channel 1, via the aperture or connector 70 arranged at the wall of the channel. According to one embodiment the material w1 fed from the first input point may be guided out from the lower part of the material conveying channel for example to a container 73 or the like via the aperture or connector 70, when the guide means 71 blocking the aperture or connector 70 in a first position is disposed in a second position in which the passageway from the material space 10 of the material conveying pipe to the outside thereof via the aperture or connector 70 is open. The guide means 71 may be for example a flap means configured to pivot about a joint 72 to a first position in which the passageway via the aperture or connector 70 from the channel space 10 of the material channel is closed, and a second position in which the passageway from the channel space of the material conveying channel via the aperture or connector 70 is open. The guide means may also be some other type of a passageway diverting means. In the embodiments illustrated in FIGS. 9 and 10 the first material fraction w1 is arranged to be guided to the outside of the material conveying channel. The first material fraction may be in this case for example glass material, such as glass bottles, glass jars or other glassware. Depending on the application some other material fractions may also be conducted from the material conveying channel. When the first material fraction w1 has been discharged for example to the container 73 which may be a movable container, the material fraction w2 stored temporarily in the feed-in containers 32 of the second input points 3 may now be discharged according to FIG. 10. Thereby the guide means 71 is pivoted to the position in which the passage from the material channel to the outside thereof via the aperture or connector 70 is closed and the material in the second feed-in containers 32 resting on the stopper means 40 is released to pass to the channel space of the material conveying channel via the feed apertures 30 and further to the lower part of the channel space of the material conveying channel, to the channel part 130. By opening the shut-off means of the valve 80, a transport air flow may again be provided to the conveying pipe and further to its delivery end. When the discharge cycle for the second material fraction w2 is completed, collecting the material may again begin according to FIG. 9.

FIG. 11 illustrates one further embodiment in which there is, in addition to the first input point 2 and the second input point 3 as illustrated above, also a third input point 5. The third input point is spaced from the first and the second input point. In the figure the third input point is arranged on a different side of the material conveying channel 1 in relation to the first and the second input points. A feed aperture 56 of a feed-in container 52 of the third input point is in the embodiment of the figure formed in the vertical direction at a height corresponding to the feed aperture 26 of the first input point 2. However, it may also be arranged at another height, considering e.g. application-specific requirements. In the embodiment of the figure, the third input point 5 comprises a feed-in container 52, the base wall 57 of which is formed to be inclined so as to slope towards the feed aperture 50 leading to the channel space of the material channel. A stopper means 40 is arranged in a first position to prevent the passage of material from the feed-in container 52 of the third input point to the channel space of the material conveying channel via the feed aperture 50. In a second position the stopper means 40 does not prevent a third material fraction w3 from passing from the feed-in container 52 to the channel space 10 of the material conveying channel 1 via the feed aperture 50. The input station as illustrated in FIG. 11, 11a, 11b enables the feeding of three material fractions in a sorted manner. When feeding the first material fraction into the channel space 10 of the material conveying channel 1, the second material fraction w2 and the third material fraction w3 may be fed into the feed-in container 32, 52 of the input point 3, 5 of each of the material fractions from the feed aperture to be stored therein. Emptying of the feed-in containers of the second and the third input points may be carried out one material fraction at a time.

In the material conveying stage the stopper means 40 are moved by the drive device 41 from the first position to the second position, i.e. the material w2, w3 resting on the stopper means 40 is released to pass, mainly by means of gravity and suction generated by the material conveying system, in the material conveying channel towards the conveying piping 200. In the conveying stage the hatches 21 of the feed apertures are closed. In the conveying stage the shut-off means 81 of the valve means 80 disposed between the conveying pipe 200 and the material conveying channel is opened by the drive device, whereby the suction generated by the partial-vacuum generator of the material conveying system, such as a pump or a fan, is able to act via the conveying pipe 200 on the material conveying channel 1. First, the channel part closest to the conveying pipe 200 is emptied, which channel part is the curved channel part 130 in the figure. The material w collected therein passes under the effect of suction to the conveying pipe 200.

The feed-in containers of the input points connected to the channel space of the material conveying channel 1 are emptied in a controlled manner, one material fraction at a time, by acting on the stopper means 40 by the drive device 41 in an order from the bottom to the top in stages or floor by floor, by moving the stopper means 40 by the drive device 41 from the first position to the second position.

In the embodiment of FIG. 3-8, between the lower part of the material conveying channel 1 and the curved channel part 130 there is arranged a replacement air channel 60 provided with a valve means opening with suction, such as a flexible flap. This generates resistance, whereby the suction coming from the conveying pipe 200 acts on the vertical material conveying channel 1, on the channel space 10 thereof, and furthers the emptying thereof in addition to gravity.

According to one embodiment the stopper means 40 is arranged in the material conveying channel 1 or in the feed-in container connected thereto by connecting the frame of the stopper device or the drive device thereof to the material conveying channel 1 and/or to the structures of the feed-in container. The drive device 41 of the stopper means 40 may in one embodiment comprise a cylinder-piston unit. The stopper means 40 is arranged to move with the piston. The piston is moved by a medium conducted to the cylinder part 41, such as gas, for example compressed air, or fluid. The drive device 41 may also be another device, for example an electrically operated drive device. According to one embodiment the stopper means 40 closes in the first position the connection to the material conveying channel 1 via the feed aperture completely. According to another embodiment the stopper means 40 closes in the first position the connection to the material conveying channel via the feed aperture partly. According to one embodiment the stopper means 40 is a plate part moved by the drive device 41. According to another embodiment the stopper means 40 is a rod or pipe part moved by the drive device 41. According to one embodiment the stopper means 40 is formed by several rod or pipe parts moved by the drive device. According to one embodiment the stopper means 40 is formed by several rod or pipe parts moved by the drive device 41. In the figures, each of the rod or pipe means of the stopper means 40 have a respective drive device 41, but part of them or all of them may according to another embodiment be moved by a common drive device.

In one embodiment the input point 2, 3, 5 may be arranged at a wall P. An aperture may be formed in the wall, the location and dimensions thereof corresponding to set requirements. The aperture of the wall P is arranged to be covered by a cover plate which may comprise switches, sensors and/or control means and/or information means L1, L2, L3. The hatch of the input point may be automatic or manually openable and closable. For example a lock, a possible reader device, such as an RFID reader, may also be disposed in connection with the hatch.

FIGS. 12, 13 and 13a illustrate one further embodiment of an input station 90 in which the first input point 2 and the second input point 3 are arranged inside a jacket 91 arranged at the upper end of the material conveying channel 1. The jacket 91 is arranged at a lower part thereof on a mounting surface s, such as floor, or on the ground surface. The jacket 91 forms a sidewall of the input station. Further, the input station has an upper wall 92, i.e. a roof. In the embodiment of the figure the roof may have been formed to be inclined, but it may also have another shape. An aperture is arranged in the jacket 91 for the feed apertures 26, 36 of the feed-in containers 22, 32. Further, the input station is provided with hatches 21, 31 at least partly covering the respective feed apertures in the first position. The jacket or another point of the input station may be provided with information means L1, L2, L3 to indicate the state of the input station or to instruct the user. The input station as illustrated in FIG. 12-13 may be applied for example as aboveground input points in a pneumatic waste conveying system. There may be several input stations side by side, spaced from each other. The input points 2, 3 have been described in more detail hereinabove. The idea in the input station illustrated in FIGS. 12 and 13 is that materials of two or more material fractions may be fed into the same input station 90.

In the embodiments illustrated in FIG. 3-8, the material conveying channel 1 extends through the structures separating different floors F1, F2, F3 . . . Fn of the building.

According to one embodiment the material conveying channel 1 is provided with means for conducting replacement air to the channel space 10 of the material conveying channel 1 at least when conveying material from the channel part of the material conveying channel to the conveying pipe 200 and further to the delivery end of the material conveying system.

The invention thus relates to a method for feeding and conveying material in a sorted manner in a pneumatic material conveying system, in which method at least two material fractions w1, w2 are fed via at least two input points 2, 3 into a channel space 10 of a material conveying channel 1 from a feed aperture and conveyed in the channel space further to a delivery end of the material conveying channel mainly by means of gravity and/or suction generated by a partial-vacuum generator of the pneumatic material conveying system. Material is fed from at least one feed aperture of at least one input point 2, 3 and a first material fraction w1 fed via at least one first input point 2, 3 is conducted to the channel space 10 of the material conveying channel 1 and stored temporarily in the channel space 1 or conducted from the channel space to the outside of the channel space, and material is fed into a feed-in container 32 of at least one second input point 3, in which feed-in container a second material fraction w2 fed therein is held in temporary storage by a stopper means 40, which stopper means 40 prevents the passage of the material fraction w2 in a first operating state from the second feed-in container 32 to the channel space 1 of the material conveying channel.

According to one embodiment, in a second stage the first material fraction w1 fed into the channel space 10 of the material conveying channel 1 and stored temporarily therein is conveyed in a material conveying pipe 200 of the pneumatic material conveying system to a separator device or container in which the material fraction is separated from transport air.

According to one embodiment, in a third stage the material fraction w2 stored temporarily in the feed-in container 32 of at least one second input point 3 is released by moving the stopper means 40 to a second position in which the stopper means 40 does not prevent the passage of material to the channel space 10 of the material conveying channel 1, whereby the material fraction w2 may pass from the feed-in container 32 to the channel space of the material conveying channel via a feed aperture 30.

According to one embodiment, materials or different material fractions are fed simultaneously into feed-in containers of different input points 2, 3.

According to one embodiment, feed-in containers 22, 32 of a first input point 2 and a second input point 3 are disposed in proximity to each other, preferably in a vertical direction one on top of the other or in a horizontal direction side by side.

According to one embodiment the first material fraction w1 is guided from the channel space by opening a passageway 71 to the outside of the channel space by a guide means 71.

According to one embodiment a material feed aperture 26 to the feed-in container 22 of the first input point is openable and closable by a first hatch 21.

According to one embodiment a material feed aperture 36 to the feed-in container 32 of the second input point is openable and closable by a second hatch 31.

According to one embodiment, in the method a third material fraction w3 is fed to at least one third input point 5, into a feed-in container 52 thereof, in which feed-in container the third material fraction w3 fed therein is held in temporary storage by a stopper means 40, which stopper means 40 prevents the passage of the material fraction w3 in a first operating state from the second feed-in container 32 to the channel space 1 of the material conveying channel.

According to one embodiment the material fraction w3 stored temporarily in the feed-in container 52 of at least one third input point 5 is discharged by releasing it, by moving the stopper means 40 to a second position in which the stopper means 40 does not prevent the passage of material to the channel space 10 of the material conveying channel 1, whereby the material fraction w3 may pass from the feed-in container 32 to the channel space of the material conveying channel via a feed aperture 30.

According to one embodiment the material fraction w1, w2, w3 conveyed to the channel space 10 of the material conveying channel 1 is conveyed in the material conveying pipe 200 of the pneumatic material conveying system by means of a pressure difference generated by the partial-vacuum generator of the pneumatic material conveying system and/or a transport air flow to the separator device or container in which the material fraction is separated from transport air.

According to one embodiment the material fraction w to be conveyed in the method is waste material, such as waste material packed into bags, or recyclable material, or one or more of the following: glass, plastic, paper, paperboard, organic material, biomaterial, mixed waste.

According the one embodiment, replacement air is introduced in the method at least in the conveying stage to an opposite side in relation to the conveying direction of a material batch collected in the channel space 10 of the material conveying channel 1.

According to one embodiment the method is used in buildings or vessels to convey waste material or recyclable material.

According to one embodiment, part of the channel space of the material conveying channel is arranged to extend in a direction different from the vertical direction.

The invention also relates to an apparatus for feeding and conveying material in a sorted manner in a pneumatic material conveying system, which apparatus comprises at least two input points 2, 3 for feeding at least two material fractions w1, w2 via a feed-in container 22, 32 of the input point 2, 3 into a channel space 10 of a material conveying channel 1 from a feed aperture 20, 30 and conveying them in the channel space further to a delivery end of the material conveying channel mainly by means of gravity and/or suction generated by a partial-vacuum generator of the pneumatic material conveying system. The apparatus comprises at least one feed aperture of the input point 2, 3 and a passageway from the feed aperture 26, 36 of the input point of the feed-in container 22, 32 to the channel space 10 of the material channel 1 from the feed aperture 20, 30, and that the passageway from the feed-in container 22 of a first input point 2 to the channel space 10 of the material channel 1 is open, and that in connection with at least a second feed-in container 32 and the channel space 10 of the material channel a stopper means 40 is arranged, which stopper means 40 prevents in a first operating state the passage of a material fraction from the second feed-in container 32 to the channel space 1 of the material conveying channel and in a second operating state releases the material fraction to pass from the second feed-in container 32 to the channel space 10 of the material conveying channel, whereby the second feed-in container is arranged to be used as a temporary storage for material in the first position of the stopper means, and that a channel part of the material conveying channel is provided with means for temporarily storing material fed into the channel or with guide means for conducting material to the outside of the channel space.

According to one embodiment, feed-in containers 22, 32 of a first input point 2 and a second input point 3 are disposed in proximity to each other, preferably in a vertical direction one on top of the other or in a horizontal direction side by side.

According to one embodiment, in the channel space of the material conveying channel a guide means 71 is arranged for guiding a material fraction w1 from the channel space for opening a passageway 70 to the outside of the channel space by the guide means 71 in a first position thereof and for closing the passageway 70 to the outside of the channel space in a second position of the guide means 71.

According to one embodiment a material feed aperture 26 to the feed-in container 22 of the first input point is openable and closable by a first hatch 21 which is preferably hinged to open and close about a vertical axis.

According to one embodiment a material feed aperture 36 to the feed-in container 32 of the second input point is openable and closable by a second hatch 31 which is preferably of a hopper type and hinged to open and close about a horizontal axis.

According to one embodiment the stopper means 40 is a plate or rod or pipe part moved by a drive device 41.

According to one embodiment the material conveying channel 1 is provided with several spaced-apart input stations formed by at least two input points 2, 3.

According to one embodiment the stopper means 40 of the feed-in container 32 of at least the second input point are arranged to move from a first position to a second position in stages, starting from the lowest stopper means 40 disposed in the first position and moving from each previous stopper means to the next lowest one, until all stopper means of the material conveying channel 1 have been moved from the first position to the second position.

According to one embodiment the apparatus comprises means 60, 61 for conducting replacement air to the channel space 10 of the material channel 1.

According to one embodiment the apparatus is arranged in a building or a vessel to be applied in conveying waste material or recyclable material.

Typically the material fractions may be waste material or recyclable material, such as waste material arranged into bags, recyclable articles, bottles, containers, metal, plastic, paper, paperboard, mixed waste, organic waste, biowaste, etc.

It is obvious to a person skilled in the art that the invention is not limited to the above-described embodiments, but it may be modified within the scope of the accompanying claims. Features possibly presented in the description together with other features may also be used separately, if needed.

The invention claimed is:

1. A method for feeding and conveying material in a sorted manner in a pneumatic material conveying system, the method comprising:
   receiving a first material fraction using at least one first input point, the at least one first input point comprising a first feed-in container and a first feed aperture;
   conducting the first material fraction to a channel space of a material conveying channel via the first feed aperture of the at least one first input point and storing the first material fraction temporarily in the channel space or conducting the first material fraction from the channel space to outside of the channel space;
   receiving a second material fraction using at least one second input point, the at least one second input point comprising a second feed-in container and a second feed aperture and temporarily holding the second material fraction in the second feed-in container with a stopper,
   wherein, in a first operating state, said stopper prevents the passage of the second material fraction from the second feed-in container to the channel space of the material conveying channel, and
   wherein the first input point with the first feed-in aperture and the first feed-in container and the second input point with the second feed-in aperture and the second feed-in container are disposed in proximity to each other, in a vertical direction one on top of the other.

2. The method according to claim 1, wherein, in a second stage, the method comprises conveying the first material fraction stored temporarily in the channel space of the material conveying channel in a material conveying pipe of the pneumatic material conveying system to a separator device or to a container and separating the first material fraction from transport air.

3. The method according to claim 1, wherein, in a third stage, the method comprises releasing the second material fraction stored temporarily in the second feed-in container by moving the stopper to a second operating state in which the stopper does not prevent the passage of material to the channel space of the material conveying channel, whereby the second material fraction may pass from the second feed-in container to the channel space of the material conveying channel via the second feed aperture.

4. The method according to claim 1, wherein the method comprises feeding the first material fraction and the second material fraction simultaneously into the first and second feed-in containers of the first and second input points.

5. The method according to claim 1, wherein the method further comprises guiding the first material fraction from the channel space by opening a passageway to the outside of the channel space by a guide means.

6. The method according to claim 1, wherein the method further comprises opening and closing a material feed aperture to the first feed-in container of the first input point using a first hatch.

7. The method according to claim 1, wherein the method further comprises opening and closing a material feed aperture to the second feed-in container of the second input point by a second hatch.

8. The method according to claim 1, wherein the method further comprises feeding a third material fraction to at least one third input point, into a third feed-in container of the at least one third input point, and temporarily holding the third material fraction in the third feed-in container with a second stopper, wherein, in a first operating state of the second stopper, the second stopper prevents the passage of the third material fraction from the third feed-in container to the channel space of the material conveying channel.

9. The method according to claim 8, wherein the method further comprises discharging the third material fraction stored temporarily in the third feed-in container of the at least one third input point, by moving the second stopper to a second operating state of the second stopper in which the second stopper does not prevent the passage of the third material fraction to the channel space of the material conveying channel, whereby the third material fraction may pass from the third feed-in container to the channel space of the material conveying channel via a third feed aperture of the at least one third input point.

10. The method according to claim 1, wherein in the method further comprises conveying the first material fraction in a material conveying pipe of the pneumatic material conveying system by means of a pressure difference generated by the partial-vacuum generator of the pneumatic material conveying system and/or a transport air flow to a separator device or container, and separating the first material fraction from transport air.

11. The method according to claim 1, wherein in the method, at least one of the first material fraction or the second material fraction comprises unpacked waste material, waste material packed into bags, recyclable material, or one or more of the following: glass, plastic, paper, paperboard, organic material, biomaterial, and mixed waste.

12. The method according to claim 1, wherein in the method further comprises introducing replacement air in the channel space of the material conveying channel.

13. The method according to claim 1, wherein the method further comprises conveying waste material or recyclable material as the first material fraction or the second material fraction in buildings or vessels.

14. The method according to claim 1, wherein in the method further comprises arranging part of the channel space of the material conveying channel to extend in a direction different from the vertical direction.

15. An apparatus for feeding and conveying material in a sorted manner in a pneumatic material conveying system, the apparatus comprising:
a material conveying channel comprising a channel space and a delivery end, wherein the material conveying channel is configured to selectively convey a first material fraction and a second material fraction to the delivery end;
a first input point comprising a first feed-in container and a first feed aperture to the channel space, wherein the first feed-in container defines a first passageway, wherein the first passageway is open, and wherein the first input point is configured to receive the first material fraction; and
a second input point comprising a second feed-in container and a second feed aperture to the channel space, wherein the second input point is configured to receive the second material fraction,
wherein second input point further comprises a stopper,
wherein, in a first operating state, the stopper is configured to prevent the passage of the second material fraction from the second feed-in container to the channel space of the material conveying channel and the second feed-in container a temporary storage for the second fraction material,
wherein, in a second operating state, the stopper is configured to release the second material fraction to pass from the second feed-in container to the channel space of the material conveying channel,
wherein a channel part of the material conveying channel is provided with means for temporarily storing material fed into the channel space and with guide means for conducting material to the outside of the channel space, and
wherein the first input point with the first feed-in aperture and the first feed-in container and the second input point with the second feed-in aperture and the second feed-in container are disposed in proximity to each other, and in a vertical direction one on top of the other.

16. The apparatus according to claim 15, wherein the guide means is configured for opening a passageway to the outside of the channel space in a first position thereof and for closing the passageway to the outside of the channel space in a second position.

17. The apparatus according to claim 15, wherein the first input point further comprises a first hatch, wherein the first hatch is openable and closable relative to the first feed aperture.

18. The apparatus according to claim 15, wherein the second input point further comprises a second hatch, wherein the second hatch is openable and closable relative to the second feed aperture.

19. The apparatus according to claim 15, wherein the stopper is a plate or rod or pipe part moved by a drive device.

20. The apparatus according to claim 15, wherein the material conveying channel is provided with a plurality of spaced-apart input stations, each input station comprising the first input point and the second input points.

21. The apparatus according to claim 20, wherein the stoppers of each second input point are movable from the first operating state to a second operating state in stages, starting with a lowest stopper disposed in the first operating state and moving in an upwards vertical direction to a vertically adjacent stopper until all stoppers of the material conveying channel have been moved from the first operating state to the second operating state.

22. The apparatus according to claim 15, wherein the apparatus further comprises means for conducting replacement air to the channel space of the material channel.

23. The apparatus according to claim 15, wherein the apparatus is configured for a building or a vessel and for conveying waste material or recyclable material as the first material fraction or the second material fraction.

24. The apparatus according to claim 15, wherein a material feed aperture to the first feed-in container of the first input point is openable and closable by a first hatch which is hinged to open and close about a vertical axis.

25. The apparatus according to claim 15, wherein a material feed aperture to the second feed-in container of the second input point is openable and closable by a second hatch which is of a hopper type and hinged to open and close about a horizontal axis.

\* \* \* \* \*